(12) United States Patent
Hashimoto et al.

(10) Patent No.: US 6,627,350 B2
(45) Date of Patent: Sep. 30, 2003

(54) NEGATIVE ELECTRODE FOR LITHIUM SECONDARY BATTERY

(75) Inventors: Takuya Hashimoto, Hirakata (JP); Atsushi Fukui, Hirakata (JP); Yasuhiko Itoh, Yawata (JP)

(73) Assignee: Sanyo Electric Co., Ltd., Osaka (JP)

( * ) Notice: Subject to any disclaimer, the term of this patent is extended or adjusted under 35 U.S.C. 154(b) by 263 days.

(21) Appl. No.: 09/864,206

(22) Filed: May 25, 2001

(65) Prior Publication Data
US 2002/0001749 A1 Jan. 3, 2002

(30) Foreign Application Priority Data
May 26, 2000 (JP) ........................... 2000-156071

(51) Int. Cl.$^7$ ............... H01M 4/58; H01M 4/88; C22C 27/06
(52) U.S. Cl. ............ 429/218.1; 429/220; 429/221; 429/223; 429/231.5; 429/224; 429/231.95; 420/548; 148/403; 252/182.1
(58) Field of Search ................. 429/218.1, 223, 429/220, 224, 221, 231.5, 231.95, 231.3, 231.1, 231.9; 252/182.1; 420/548, 537, 529, 550, 578; 75/249; 428/546, 650; 148/403, 437, 438

(56) References Cited

U.S. PATENT DOCUMENTS

| | | | | |
|---|---|---|---|---|
| 4,084,963 A | * | 4/1978 | Anthony et al. | 75/138 |
| 4,792,430 A | * | 12/1988 | Horst | 420/548 |
| 5,324,599 A | * | 6/1994 | Oyama et al. | 429/192 |
| 5,556,721 A | | 9/1996 | Sasaki et al. | |
| 2002/0182495 A1 | * | 12/2002 | Ogura et al. | 429/218.1 |

FOREIGN PATENT DOCUMENTS

JP  7-24219  3/1995

* cited by examiner

*Primary Examiner*—Patrick Ryan
*Assistant Examiner*—Raymond Alejandro
(74) *Attorney, Agent, or Firm*—Kubovcik & Kubovcik

(57) ABSTRACT

The present invention provides a negative electrode for a lithium secondary battery and a lithium secondary battery having the negative electrode. The negative electrode includes an aluminum alloy powder as an active material, wherein the alloy is substantially amorphous, and is represented by the formula $Al_xSi_yM_z$, where M is at least one transition metal selected from the group consisting of Ni, Co, Cu, Fe, Cr and Mn;

x, y and z are $40 \leq x \leq 80$; $10 \leq y \leq 50$ and $1 \leq z \leq 20$, respectively, and x+y+z=100; and average particle diameter of the alloy is not greater than 50 µm.

8 Claims, 1 Drawing Sheet

A

NEGATIVE ELECTRODE FOR LITHIUM SECONDARY BATTERY

FIELD OF THE INVENTION

The present invention relates to a negative electrode for a lithium secondary battery that includes an aluminum alloy as a negative electrode active material. More specifically, the present invention relates to an improved negative electrode active material which provides a negative electrode with which it is possible to prepare a lithium secondary battery having excellent charge-discharge cycle characteristics.

BACKGROUND OF THE INVENTION

When a lithium metal plate is used for a negative electrode for a lithium secondary battery, active dendritic lithium is deposited out during charge, and the deposited lithium reacts with the electrolyte to decrease the negative electrode capacity and causes an internal short-circuit of the battery when it grows by repeated charging and discharging. If a lithium-aluminum alloy sheet that is electrochemically prepared from lithium and crystalline aluminum is used instead of a lithium metal sheet, reaction of lithium with an electrolyte and formation and growth of dendritic lithium by repeated charge-discharge cycles are inhibited, and charge-discharge cycle characteristics are improved. However, electrochemical reaction (alloying reaction) rate of lithium and crystalline aluminum is low, and a dramatic improvement of charge-discharge cycle characteristics cannot be expected.

It has been proposed that a lithium-aluminum alloy sheet that is prepared electrochemically from lithium and amorphous aluminum be used for a negative electrode for a lithium secondary battery instead of the above-explained lithium aluminum alloy sheet (Japanese Patent Laid-open Publication No. 63-13267). According to this publication, the reaction rate of the electrochemical reaction between lithium and amorphous aluminum is higher than that between lithium and crystalline aluminum, and charge-discharge cycle characteristics are improved as well.

However, the inventors of the present invention found that inactive $Li_2O$ is deposited out on the surface of a negative electrode because the lithium aluminum alloy sheet has a small contact (reaction) area between the alloy sheet and an electrolyte. Therefore, the obtained charge-discharge cycle characteristics are not satisfactory.

OBJECT OF THE INVENTION

Objects of the present invention are to provide a negative electrode for a lithium secondary battery that has excellent charge-discharge cycle characteristics and to provide a lithium secondary battery which includes the negative electrode.

SUMMARY OF THE INVENTION

The present invention provides a negative electrode for a lithium secondary battery comprising aluminum alloy powder as an active material,
  wherein the alloy is substantially amorphous and is represented by the formula $Al_xSi_yM_z$;
  where M is at least one transition metal selected from the group consisting of Ni, Co, Cu, Fe, Cr and Mn;
  x, y and z are $40 \leq x \leq 80$; $10 \leq y \leq 50$ and $1 \leq z \leq 20$, respectively, and $x+y+z=100$; and
  average particle diameter of the alloy is not greater than 50 µm.

Figure 1:
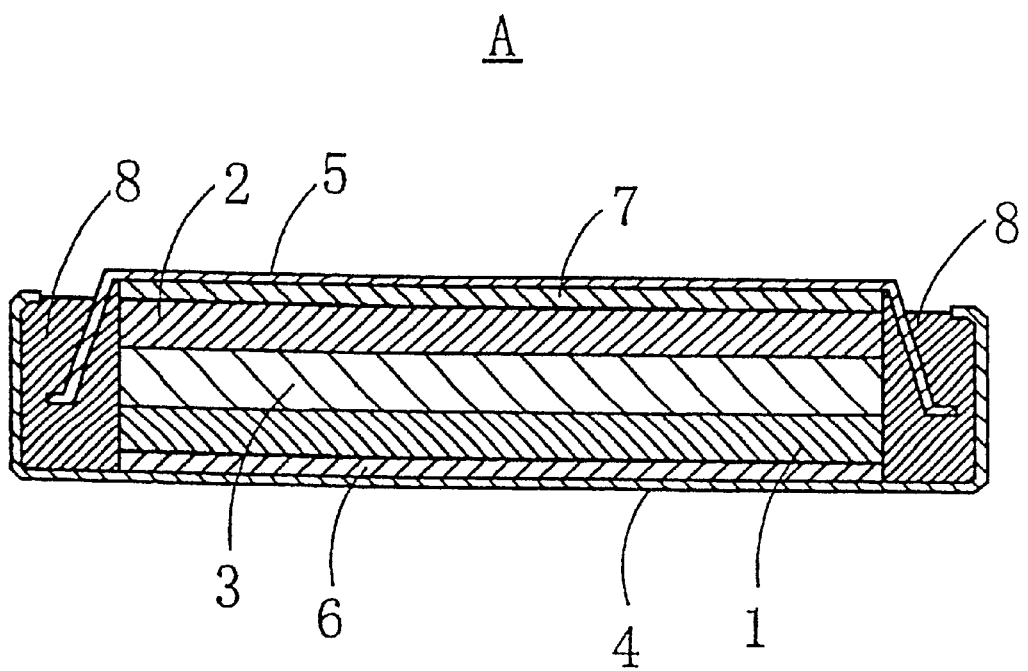
FIG. 1 is a cross-section of a lithium secondary battery prepared in the examples.

The following elements are shown in the drawings:
A: lithium secondary battery
1: a positive electrode
2: a negative electrode
3: a separator
4: a positive electrode can
5: a negative electrode can
6: a positive electrode current collector
7: a negative electrode current collector
8: insulation packing

DETAILED EXPLANATION OF THE INVENTION

A substantially amorphous aluminum alloy is used in the present invention because the amorphous alloy has good ductility and does not easily form a fine powder as compared to crystalline aluminum alloy. A crystalline aluminum alloy tends to form a fine powder by volume changes when lithium is inserted and released during charge-discharge cycles. Powdering increases contact resistance between alloy particles and decreases electron conductivity, and charge-discharge cycle characteristics are easily deteriorated. In the present invention, a substantially amorphous aluminum alloy means that a powder X-ray diffraction pattern shows halo portion and an amorphous degree (A) as defined by the following formula is equal to or greater than 0.3. A greater amorphous degree (A) means more amorphousness.

Amorphous degree (A)=strength of highest peak of profile in halo portion/strength of highest peaks of all profiles The substantially amorphous aluminum alloy can be prepared by a liquid quenching method, a vacuum distillation, an ion plating method, a mechanical alloying method, and the like. The liquid quenching method is preferable because it is low in cost and can be used in mass production. The liquid quenching method is a rapid solidification method, for example, a roll method (an alloy is melted by heat to prepare a melt, the melt is transferred onto a rapidly spinning copper roller (single roll method or double roll method)), a gas atomization method (the melt is atomized with an inert gas), and the like.

Powder aluminum alloy is used because the contact (reaction) area is greater than an aluminum alloy sheet and charge-discharge efficiency is better than with a sheet. When an aluminum alloy sheet is used, electrically inactive $Li_2O$ is deposited on the negative electrode to cause a decline in charge-discharge efficiency because the contact (reaction) area between the alloy and an electrolyte is small and thus the electric current density is large. The average particle diameter of the powder aluminum alloy is preferably not greater than 50 µm. If the average particle diameter is greater than 50 µm, the powder easily becomes fine. A smaller average particle diameter is more preferable. However, it is normally difficult to obtain a powder with an average particle diameter smaller than 3 µm because the aluminum alloy has a large ductility.

The substantially amorphous aluminum alloy in the present invention is represented by the formula $Al_xSi_yM_z$;
  where M is at least one transition metal selected from the group consisting of Ni, Co, Cu, Fe, Cr and Mn; and
  x, y and z are $40 \leq x \leq 80$; $10 \leq y \leq 50$ and $1 \leq z \leq 20$, respectively, and $x+y+z=100$.

Si makes the specific capacity of the alloy smaller. When y is less than 10, it is difficult to increase sufficiently the specific capacity. When y is greater than 50, an amorphous degree (A) of the alloy is small. Therefore, when y is out of the range, charge-discharge cycle characteristics decline. The transition metal M makes the amorphous degree (A) of the alloy greater. When z is less than 1 or greater than 20, it is difficult to obtain a substantially amorphous aluminum alloy, and charge-discharge cycle characteristics decline. A more preferred range is $5 \leq z \leq 10$.

To prepare a lithium secondary battery having excellent charge-discharge cycle characteristics, it is also important to use a positive electrode active material having large electrochemical reversibility for the positive electrode as well as the negative electrode active material of the present invention for the negative electrode. As a positive electrode active material, lithium cobaltate ($LiCoO_2$), lithium nickelate ($LiNiO_2$), lithium manganate ($LiMnO_2$) and the like, alone or in admixture, can be exemplified.

The electrolyte used in the lithium secondary battery of the present invention is not particularly limited. As a lithium salt for a solute of the electrolyte, there can be mentioned $LiClO_4$, $LiCF_3SO_3$, $LiPF_6$, $LiN(CF_3SO_2)_2$, $LiN(C_2F_5SO_2)_2$, $LiBF_4$, $LiSbF_6$, $LiAsF_6$, and the like. $LiPF_6$ or an imide represented by the formula $LiN(C_mF_{2m+1}SO_2)(C_nF_{2n+1}SO_2)$ ($1 \leq m \leq 4$ and $1 \leq n \leq 4$) is preferable to obtain a lithium secondary battery having a large discharge capacity.

As a solvent of the electrolyte, a cyclic carbonate, for example ethylene carbonate, propylene carbonate, vinylene carbonate, butylene carbonate and the like, and mixtures of the cyclic carbonate and a low-boiling point solvent, for example dimethyl carbonate, diethyl carbonate, methyl ethyl carbonate, 1,2-dimethoxyethane, ethoxymethoxyethane and the like can be illustrated.

DESCRIPTION OF PREFERRED EMBODIMENTS

The present invention is described below in detail in conjunction with certain examples. However, it is of course understood that the present invention is not limited to the following examples. The present invention can be modified within the scope and spirit of the appended claims.

[Experiment 1]

A negative electrode of the present invention and a comparative negative electrode and secondary batteries including them were prepared to compare charge-discharge cycle characteristics.

EXAMPLE 1

[Preparation of Positive Electrode]

80 parts by weight of $LiCoO_2$ having an average particle diameter of 20 $\mu$m, 10 parts by weight of acetylene black (as a conductive agent) and 10 parts by weight of polytetrafluoroethylene (as a binder) were mixed and the mixture was pressed and cut to form a disc with a diameter of 17 mm to prepare a positive electrode.

[Preparation of Negative Electrode]

Al, Si and a transition element M as shown in Table 1 (the purity of each is 99.9 weight %) were weighed in an atomic ratio of 65:25:10 and mixed in a mortar. After being press formed, an ingot was prepared by an arc melting method. The ingot was melted, and was solidified rapidly by a single roll method to prepare pieces of alloy. The alloy pieces were crushed by a pin mill under argon atmosphere to prepare alloy powders. It was confirmed that each alloy powder having an atomic ratio of Al, Si and M of 65:25:10 had the formula $Al_{65}Si_{25}M_{10}$ by emission spectroscopy (ICP). An average particle diameter of each alloy powder was 30 $\mu$m according to a particle distribution measurement equipment using a laser diffraction particle size analyzer.

80 weight % of the alloy powder (as a negative electrode active material) and 20 weight % of polytetrafluoroethylene (as a binder) were mixed and pressed and cut to prepare a disc having a diameter of 17 mm to prepare a negative electrode of the present invention. The same weight of the alloy powder was used for each negative electrode.

[Preparation of Electrolyte]

$LiPF_6$ was dissolved in a mixture of ethylene carbonate and diethyl carbonate at a volume ratio of 1:1 in an amount of 1 mol/l to prepare an electrolyte.

[Preparation of Lithium Secondary Battery]

Coin shaped lithium secondary batteries A1~A7 were prepared by using the positive electrode, negative electrode and electrolyte prepared above. A fine porous film of polypropylene was used as a separator.

FIG. 1 is a cross-section illustrating the prepared coin-shaped lithium secondary battery. The lithium secondary battery includes a positive electrode 1, a negative electrode 2, a separator 3, a positive electrode can 4, a negative electrode can 5, a positive electrode current collector 6, a negative electrode current collector 7 and an insulator packing 8 made from polypropylene. The positive electrode 1 and the negative electrode 2 are housed in a battery can comprising a positive electrode can 4 and a negative electrode can 5 on opposite sides of the separator 3. The positive electrode 1 and the negative electrode 2 are connected to the positive electrode can 4 and the negative electrode can 5 through the positive electrode current collector 6 and the negative electrode current collector 7, respectively, to provide a structure to the battery capable of being charged and discharged.

[Comparative Example]

An aluminum disc having a thickness of 0.3 mm and a diameter of 7.8 mm prepared by a liquid quenching method was inserted between two lithium discs each having a thickness of 0.1 mm and a diameter of 7.8 mm to prepare a disc of a negative electrode (a comparative negative electrode) having a thickness of 0.5 mm and a diameter of 7.8 mm. The comparative negative electrode capacity is the same as that of the negative electrode of the lithium secondary battery A1 of the present invention.

A mixture of polytetrafluoroethylene (PTFE) and titanium disulfide ($TiS_2$) at a weight ratio of 0.1:99.9 was coated on one side of a nickel wire mesh and pressed and cut into a disc of a diameter of 7.0 mm to prepare a positive electrode. A lithium secondary battery S was prepared in the same manner as lithium secondary batteries A1~A7 except that the positive and negative electrodes prepared above were used.

[Charge-discharge Cycle Characteristics]

A charge-discharge cycle test was conducted in which lithium secondary batteries A1~A7 were charged to 4.1 V at 100 $\mu$A at 25° C., and then were discharged to 2.8 V (this is a cycle). The number of cycles required until the discharge capacity was reduced to 80% of the original discharge capacity (the first cycle) was determined.

A charge-discharge cycle test was conducted with the comparative battery S in the same manner as the batteries A1~A7.

The results are shown in Table 1. An amorphous degree (A) of each negative electrode active material (aluminum alloy or aluminum) used for each battery is also shown in Table 1. The fourth column, "cycles", shows relative indexes when the number of cycles of lithium secondary battery A1 is taken as 100.

TABLE 1

| Battery | M in $Al_{65}Si_{25}M_{10}$ | Amorphous degree (A) | Cycles |
|---|---|---|---|
| A 1 | Cr | 0.42 | 100 |
| A 2 | Ni | 0.40 | 98 |
| A 3 | Co | 0.41 | 98 |
| A 4 | Cu | 0.36 | 95 |
| A 5 | Fe | 0.37 | 97 |
| A 6 | Mn | 0.39 | 98 |
| A 7 | Atomic ratio of Cr:Ni = 1:1 | 0.42 | 99 |
| S | — | 0.22 | 42 |

As shown in Table 1, lithium secondary batteries A1~A7 having a negative electrode of the present invention in which an amorphous aluminum alloy powder having an average particle size of not greater than 50 μm is used as a negative electrode active material have better charge-discharge cycle characteristics as compared to lithium secondary battery S having a comparative negative electrode. It is believed that the reason why the lithium secondary battery S does not have good charge-discharge cycle characteristics is that the aluminum alloy of the negative electrode has a small contact area (reaction area) and electrochemically inactive $Li_2O$ was deposited out on the negative electrode to dramatically reduce charge-discharge efficiency. Other possible reasons for the decreased charge-discharge cycle characteristics of lithium secondary battery S are considered to be that the amorphous degree (A) is small because aluminum used for the negative electrode was prepared by liquid quenching method without addition of a rare earth element or transition metal element to the aluminum, and titanium disulfide used as the positive electrode active material does not have good electrochemical reversibility.

[Experiment 2]

The relationship between the average particle size of the aluminum alloy and charge-discharge cycle characteristics was studied.

Lithium secondary batteries B1~B4 were prepared in the same manner as lithium secondary battery A1 except that the average particle diameter of the substantially amorphous alloy powder represented by $Al_{65}Si_{25}Cr_{10}$ was 3 μm, 15 μm, 50 μm or 60 μm, respectively. That is, only the average particle diameter of the alloy is different from that of battery A1.

The charge-discharge cycle characteristics of the batteries were evaluated in the same manner as Experiment 1 to obtain the number of cycles until the discharge capacity was reduced to 80% of that in the first cycle. The results are shown in Table 2. An amorphous degree (A) of the negative electrode active material (aluminum alloy or aluminum) used for each battery is also shown in Table 2. The results for lithium secondary battery A1 are also shown. The fourth column, "cycles", shows relative indexes when the number of cycles of lithium secondary battery A1 is taken as 100.

TABLE 2

| Battery | Average Particle Diameter of Aluminum Powder (μm) | Amorphous degree (A) | Cycles |
|---|---|---|---|
| B 1 | 3 | 0.42 | 100 |
| B 2 | 15 | 0.42 | 100 |
| A 1 | 30 | 0.42 | 100 |
| B 3 | 50 | 0.42 | 94 |
| B 4 | 60 | 0.42 | 62 |

As shown in Table 2, lithium secondary batteries A1 and B1~B3 have excellent charge-discharge cycle characteristics as compared to lithium secondary battery B4. It is believed the reason why charge-discharge cycle characteristics of lithium secondary battery B4 were not good is that the alloy powder represented by $Al_{65}Si_{25}Cr_{10}$ having an average particle diameter of 60 μm used as a negative electrode active material for lithium secondary battery B4 was powdered. Therefore, it is important to use an aluminum alloy having an average particle diameter of not greater than 50 μm.

[Experiment 3]

The relationship between x, y and z in formula $Al_xSi_yM_z$ and charge-discharge cycle characteristics was studied.

Lithium secondary batteries C1~C34 were prepared in the same manner as lithium secondary battery A1 except that different alloy powders having an average particle diameter of 30 μm were used as shown in Table 3. Lithium secondary batteries C2~C5, C14~C17, C20~C23, C25~C28 are batteries having negative electrodes of the present invention, and the other batteries have comparative negative electrodes.

The charge-discharge cycle characteristics of the batteries were evaluated in the same manner as Experiment 1 to obtain the number of cycles until discharge capacity was reduced to 80% of that in the first cycle. The results are shown in Table 3. An amorphous degree (A) of the negative electrode active material (aluminum alloy of $Al_xSi_yCr_z$) used for each battery is also shown in Table 3. The results for lithium secondary battery A1 are also shown. The fourth column, "cycles", shows relative indexes when the number of cycles of lithium secondary battery A1 is taken as 100.

TABLE 3

| Battery | x, y and z in $Al_xSi_yCr_z$ | | | Amorphous degree (A) | Cycles |
|---|---|---|---|---|---|
| | x | y | z | | |
| A1 | 65 | 25 | 10 | 0.42 | 100 |
| C1 | 30 | 60 | 10 | 0.26 | 67 |
| C2 | 40 | 50 | 10 | 0.36 | 94 |
| C3 | 50 | 40 | 10 | 0.38 | 98 |
| C4 | 60 | 30 | 10 | 0.42 | 104 |
| C5 | 80 | 10 | 10 | 0.32 | 82 |
| C6 | 85 | 5 | 10 | 0.24 | 66 |
| C7 | 40 | 59.5 | 0.5 | 0.13 | 52 |
| C8 | 50 | 49.5 | 0.5 | 0.14 | 55 |
| C9 | 60 | 39.5 | 0.5 | 0.17 | 58 |
| C10 | 70 | 29.5 | 0.5 | 0.18 | 61 |
| C11 | 80 | 19.5 | 0.5 | 0.20 | 63 |
| C12 | 85 | 14.5 | 0.5 | 0.21 | 64 |
| C13 | 40 | 59.0 | 1.0 | 0.23 | 63 |
| C14 | 50 | 49.0 | 1.0 | 0.31 | 70 |
| C15 | 60 | 39.0 | 1.0 | 0.32 | 73 |
| C16 | 70 | 29.0 | 1.0 | 0.34 | 78 |
| C17 | 80 | 19.0 | 1.0 | 0.35 | 80 |
| C18 | 85 | 14.0 | 1.0 | 0.28 | 67 |
| C19 | 40 | 55.0 | 5.0 | 0.26 | 66 |
| C20 | 50 | 45.0 | 5.0 | 0.34 | 88 |
| C21 | 60 | 35.0 | 5.0 | 0.38 | 100 |
| C22 | 70 | 25.0 | 5.0 | 0.39 | 101 |
| C23 | 80 | 15.0 | 5.0 | 0.42 | 104 |

TABLE 3-continued

| Battery | x, y and z in $Al_xSi_yCr_z$ | | | Amorphous degree (A) | Cycles |
|---|---|---|---|---|---|
| | x | y | z | | |
| C24 | 85 | 10.0 | 5.0 | 0.28 | 68 |
| C25 | 40 | 40 | 20 | 0.31 | 72 |
| C26 | 50 | 30 | 20 | 0.32 | 73 |
| C27 | 60 | 20 | 20 | 0.33 | 77 |
| C28 | 70 | 10 | 20 | 0.32 | 72 |
| C29 | 75 | 5 | 20 | 0.25 | 64 |
| C30 | 40 | 38 | 22 | 0.12 | 52 |
| C31 | 50 | 28 | 22 | 0.14 | 54 |
| C32 | 60 | 18 | 22 | 0.17 | 59 |
| C33 | 70 | 8 | 22 | 0.19 | 61 |
| C34 | 75 | 3 | 22 | 0.21 | 62 |

As shown in Table 3, lithium secondary batteries C2~C5, C14~C17, C20~C23 and C25~C28 have excellent charge-discharge cycle characteristics as compared to lithium secondary batteries having comparative negative electrodes. Therefore, it is important for the aluminum alloy to be used for a negative electrode that can provide excellent charge-discharge cycle characteristics, to have x, y and z in the formula $Al_xSi_yM_z$ in a range of 40~80, 10~50 and 1~20, respectively.

It was confirmed that when M is each of the other transition elements, it is also important that x, y and Z of the aluminum alloy be in the above ranges.

[Experiment 4]

A positive electrode active material was studied.

Lithium secondary batteries D1~D4 were prepared in the same manner as lithium secondary battery A1 except that each battery has a different positive electrode active material, i.e., $LiNiO_2$, $LiMnO_2$, a 1:1 weight ratio mixture of $LiCoO_2$ and $LiNiO_2$, and $TiS_2$, respectively, were used as shown in Table 3. An amount of the positive electrode active material was adjusted such that the positive electrode of each battery has the same original capacity.

The charge-discharge cycle characteristics of the batteries were evaluated in the same manner as Experiment 1 to obtain the number of cycles until discharge capacity was reduced to 80% of that in the first cycle. The results are shown in Table 4. The results for lithium secondary battery A1 are also shown. The third column, "cycles", shows relative indexes when the number of cycles of lithium secondary battery A1 is taken as 100.

TABLE 4

| Battery | Positive Electrode Active Material | Cycles |
|---|---|---|
| A 1 | $LiCoO_2$ | 100 |
| D 1 | $LiNiO_2$ | 99 |
| D 2 | $LiMnO_2$ | 99 |
| D 3 | Mixture of $LiCoO_2$ & $LiNiO_2$ (1:1 weight ratio) | 99 |
| D 4 | $TiS_2$ | 56 |

As shown in Table 4, lithium secondary batteries A1 and D1~D3 have excellent charge-discharge cycle characteristics as compared to lithium secondary battery D4. This is because $TiS_2$ used as the positive electrode active material for lithium secondary battery D4 does not have good reversibility during charge-discharge cycles. Therefore, at least one lithium-transition metal complex oxide selected from lithium cobaltate, lithium nickelate and lithium manganate is also preferred for best results.

ADVANTAGES OF THE INVENTION

The present invention can provide a negative electrode and a lithium secondary battery having excellent charge-discharge characteristics.

What is claimed is:

1. A negative electrode for a lithium secondary battery comprising an aluminum alloy powder as an active material
   wherein said alloy is substantially amorphous and is represented by a formula $Al_xSi_yM_z$, where M is at least one transition metal selected from the group consisting of Ni, Co, Cu, Fe, Cr and Mn;
   x, y and z are $40 \leq x \leq 80$, $10 \leq y \leq 50$ and $1 \leq z \leq 20$, respectively, and x+y+z=100; and
   average particle diameter of said alloy is not greater than 50 μm.

2. The negative electrode for a lithium secondary battery according to claim 1, wherein said aluminum alloy is prepared by a liquid quenching method.

3. The negative electrode for a lithium secondary battery according to claim 1, wherein M is Cr.

4. The negative electrode for a lithium secondary battery according to claim 1, wherein $5 \leq z \leq 10$.

5. A lithium secondary battery comprising a positive electrode, a negative electrode and a non-aqueous electrolyte
   wherein an active material of said positive electrode comprises at least a lithium-transition metal complex oxide selected from the group consisting of lithium cobaltate, lithium nickelate and lithium manganate; and
   an active material of said negative electrode comprises aluminum alloy powder;
   wherein said alloy is substantially amorphous and is represented by a formula $Al_xSi_yM_z$, where M is at least one transition metal selected from the group consisting of Ni, Co, Cu, Fe, Cr and Mn;
   x, y and z are $40 \leq x \leq 80$, $10 \leq y \leq 50$ and $1 \leq z \leq 20$, respectively, and x+y+z=100; and
   average particle diameter of said alloy is not greater than 50 μm.

6. The lithium secondary battery according to claim 5, wherein said aluminum alloy is prepared by a liquid quenching method.

7. The lithium secondary battery according to claim 5, wherein M is Cr.

8. The lithium secondary battery according to claim 5, wherein $5 \leq z \leq 10$.

* * * * *